United States Patent [19]

Salter et al.

[11] Patent Number: 4,838,738

[45] Date of Patent: Jun. 13, 1989

[54] PRESSURE COMPENSATED WEIGH SYSTEM

[75] Inventors: James A. Salter, Katy; Thomas R. Schmidt, Houston; Thomas S. DeWitz, Houston; Charles M. Arbore, Houston; Frederick M. H. J. Duysings, Houston, all of Tex.; Johannes W. Van Der Meer; David Brown; Henricus C. J. Venselaar, all of Amsterdam, Netherlands

[73] Assignee: Shell Oil Company, Houston, Tex.

[21] Appl. No.: 113,313

[22] Filed: Oct. 28, 1987

[51] Int. Cl.[4] .............................................. B65G 51/16
[52] U.S. Cl. ........................................ 406/14; 406/12; 406/23; 406/93
[58] Field of Search ....................... 406/12, 14, 15, 19, 406/21, 23, 30, 31, 32, 93, 142

[56] References Cited

U.S. PATENT DOCUMENTS

| 4,270,558 | 6/1981 | Forster et al. | 406/31 |
| 4,482,275 | 11/1985 | Shinozaki et al. | 406/12 |
| 4,521,139 | 6/1985 | Kretschmer et al. | 406/19 |
| 4,529,336 | 7/1985 | Shinozaki et al. | 406/93 |
| 4,662,799 | 5/1987 | Paul et al. | 406/142 |

FOREIGN PATENT DOCUMENTS

135033 8/1983 Japan ...................................... 406/14

Primary Examiner—Sherman D. Basinger
Assistant Examiner—Thomas J. Brahan

[57] ABSTRACT

The present invention is directed to an apparatus and method for controlling mass flow rate of a particulate solids and gas mixture to a reactor. In particular, the fast response of a mass flow rate-indicating device is combined with the longer term accuracies in changes in the total mass from weigh cells to yield rapid and more accurate loss-in-weight measurements than conventional systems.

60 Claims, 1 Drawing Sheet

PRESSURE COMPENSATED WEIGH SYSTEM

BACKGROUND OF THE INVENTION

Conventional systems for controlling the mass flow rate of fine materials, such as particulate coal, supplied as a fuel into for example a furnace, such as a coal fired boiler, generally employ load cell based weight rate measuring systems to control the gross mass flow rate of the coal to boilers such as the system described in U.S. Pat. No. 4,490,077. However, such systems do not disclose rapid manual or automatic on-line recalibration of mass flow rate controlling systems within fractions of a second to accommodate changing operating conditions as required by the present invention.

U.S. Pat. No. 3,635,082 describes the determination of mass flow from velocity and density measurements of a coal and gas stream using two capacitance transducers mounted a known distance apart in the supply line between a coal storage vessel and furnace. The measurement system described by this patent relies on large signal variations, including introducing a slug of compressed gas into the supply line to produce a marker gap, to observe "slugs" of coal in a gas stream in an industrial process. Such a system would not be compatible with the present invention which requires a uniform mass flow rate of coal introduced to the gasifier over periods of time of approximately 5 seconds or less.

Other conventional systems control the mass flow rate by determining the mass flow rate indirectly via optical measurement of the coal concentration within a conduit leading to the furnace. Optical measurements, such as radiation absorption for light, are limited to applications of low coal density suspensions, say less than 10 kg/cubic meter, since light must be transmitted through the coal mixture present in the conduit. For example, German patent publication No. 2554565 describes an indirect method of deriving mass velocity of coal transported to a gasifier by optically measuring the coal concentration at a point in the transport line and from the velocity of separately supplied carrier gas. First, the coal entrains gas as it passes from a storage vessel into a transport line. Additionally, the carrier gas, which is not measured, is introduced to assist the coal in discharging from the vessel to the transport line en route to the gasifier. Since it is the total gas stream in the transport line in addition to other factors which govern the mass flow rate, the invention described by this patent could not be used to control the mass flow rate of coal to a gasifier within the desired accuracy, say plus or minus 2 percent, operated with varying suspension densities of 50–800 kg/cubic meter, which are characteristic of various coal types and at various flow conditions.

The present invention is directed to overcoming this problem in the prior art.

Applicants are not aware of any prior art which, in their judgment as persons skilled in this particular art, would anticipate or render obvious the present invention. However, for the purpose of fully developing the background of this invention, and establishing the state of requisite art, the following art is set forth: U.S. Pat. Nos. 3,689,045; 4,582,454; 4,488,837; Re 31,676; 4,004,647; 4,482,275, and Chemie-Ing. Tech. 47 105 (1975).

SUMMARY OF THE INVENTION

The primary purpose of the present invention relates to controlling the mass flow rate of solids and gas mixture to a reactor. In particular, this invention relates to controlling the mass flow rate of particulate solid coal and gas mixture to a pressurized gasifier.

Preferably, such an apparatus includes: means for weighing the mixture in a vessel, means for obtaining a signal relative to the weight of the mixture in the vessel, means for transmitting the signal relative to the weight of the mixture in the vessel to a first mass flow rate-indicating means, means for transporting the mixture from the vessel to the reactor, means for obtaining a signal relative to the mass flow rate of the mixture transported to the reactor, means for transmitting the signal relative to the mass flow rate of the mixture to a second mass flow rate-indicating means, and means for combining the signals to obtain a corrected mass flow rate of the mixture transported to the reactor.

Preferably, a method for controlling the mass flow rate of solids to a reactor includes: weighing the mixture in a vessel, obtaining a signal relative to the weight of the mixture in the vessel, transmitting the signal relative to the weight of the mixture in the vessel to a first mass flow rate-indicating means, transporting the mixture from the vessel to the reactor, obtaining a signal relative to the mass flow rate of the mixture transported to the reactor, transmitting the signal relative to the mass flow rate of the mixture to a second mass flow rate-indicating means, and combining the signals to obtain a corrected mass flow rate of the mixture transported to the reactor.

The various features of novelty which characterize the invention are pointed out with particularity in the claims forming a part of this disclosure. For a better understanding of this invention, its operating advantages and specific object obtained by its uses, reference may be made to the accompanying drawings and descriptive matter in which there are illustrated preferred embodiments of the invention.

DESCRIPTION OF A PREFERRED EMBODIMENT

Generation of synthesis gas occurs by partially combusting organic or carbonaceous fuel, such as coal, at relatively high temperatures in the range of 800°–2000° C. and at a pressure range of from about 1–200 bar in the presence of oxygen or oxygen-containing gases in a gasifier. Oxygen-containing gases include air, oxygen enriched air, and oxygen optionally diluted with steam, carbon dioxide and/or nitrogen.

In the present invention, the fuel and gas mixture is discharged from a feed vessel apparatus, preferably having multiple outlets, each outlet being in communication with at least one burner associated with the gasifier. Typically. a gasifier will have four burners in diametrically opposing positions. Generally, the burners have their discharge ends positioned to introduce the resulting flame and the agent of combustion into the gasifier.

Of particular importance in the manufacture of synthesis gas is the uniform manner in which the particulate fuel is introduced to the burners within the gasifier, and in particular, the uniform mass flow rate of the fuel.

Fluctuations of coal mass flow rate to burners within a coal gasification reactor, hereinafter referred to as a gasifier, are detrimental to the gasifier's performance. For example, fluctuations of the coal mass flow rate can cause inefficient combustion of fuel within the gasifier, i.e. zones of under heating generated next to zones of overheating in the gasifier. As a result, in the zones of underheating the fuel is not completely gasified and in zones of overheating the fuel is completely converted into less valuable products, viz. carbon dioxide and water vapor. Additionally, damaging heat fluxes to the burner face can cause thermal stresses on the burner face possibly resulting in shorter burner life. Furthermore, locally high temperatures in the gasifier could damage the refractory lining which is normally arranged at the inner surface of the gasifier wall.

Based on the reasons identified above, maintaining a uniform mass flow rate of coal and gas mixture to a gasifier is essential to effectively operating a gasifier. Since the residence time of a gasifier can be 5 seconds or less, the coal mass flow rate should preferably be constant over periods of this order and preferably over shorter periods to maintain constant local conditions.

Measurement and automatic on-line control and recalibration of coal mass flow rate to the burners of a gasifier by conventional means, such as weigh cells, are too slow to ensure constant mass flow rate to the burner of a gasifier over time periods stated above. Similarly, other systems for controlling the mass flow rate by determining the mass flow rate indirectly via optical measurement of the coal concentration within a conduit leading to the furnace are limited to applications of low coal density suspensions. Furthermore, the capability of directly measuring the mass velocity of the coal, rather than using optical measuring techniques, allows the flexibility of operating the process at varying and higher suspension densities, say 150–800 kg/cubic meter and at varying moisture contents of coal, which are characteristic of different coal types.

The present invention employs a combination of mechanical components, advanced electronic technology integrated by computer software to yield a weight rate measurement system that can measure mass flow rates of coal and gas mixtures contained in vessels maintained at high pressures, say greater than 200 psig, within plus or minus 2% accuracy as compared with plus or minus 5–10% accuracy for conventional loss-in-weight measurement systems. The present invention utilizes the fast response, e.g. seconds or less, of a mass flow rate-indicating device, which accuracy may drift over time, e.g. hours or days, due to e.g. moisture in the mixture, combined with the slowly responding, e.g. minutes, but longer term accuracies in changes in the total mass from weigh cells to yield rapid and more accurate loss-in-weight measurements than conventional systems. In a like manner, this invention permits manual or automatic on-line recalibration of the mass flow rate-indicating devices used in the measurement system.

An advantage of the present invention is controlling the mass flow rate of a coal and gas mixture to a gasifier having a residence time of five seconds or less and thereby, preventing zones of underheating and overheating within the reactor.

Another advantage of the present invention is protection of the burners and refractory lining within the gasifier due to preventing zones of underheating and overheating.

An additional advantage of the present invention is more efficient conversion of solid fuel in the production of synthesis gas.

A further advantage of the present invention is the capability to directly measure the mass velocity of the coal, and thereby allow the flexibility of operating the process at varying and higher suspension densities, say 150–800 kg/cubic meter and at varying moisture contents of coal, which are characteristic of different coal types.

Although the invention is described hereinafter primarily with reference to particulate coal, the method and apparatus according to the invention are also suitable for catalysts and other finely divided reactive solids which could be partially combusted, such as lignite, anthracite, bituminous, brown coal, soot, petroleum coke, and the like. Preferably, the size of solid carbonaceous fuel is such that 90 percent by weight of the fuel has a particle size smaller than 100 mesh (A.S.T.M.).

Having thus generally described the apparatus and method of the present invention, as well as its numerous advantages over the art, the following is a more detailed description thereof, given in accordance with specific reference to the drawings. However, the drawings are of process flow type in which auxiliary equipment, such as pumps, compressors, cleaning devices, etc. are not shown. All values are merely exemplary or calculated.

Figure 1:
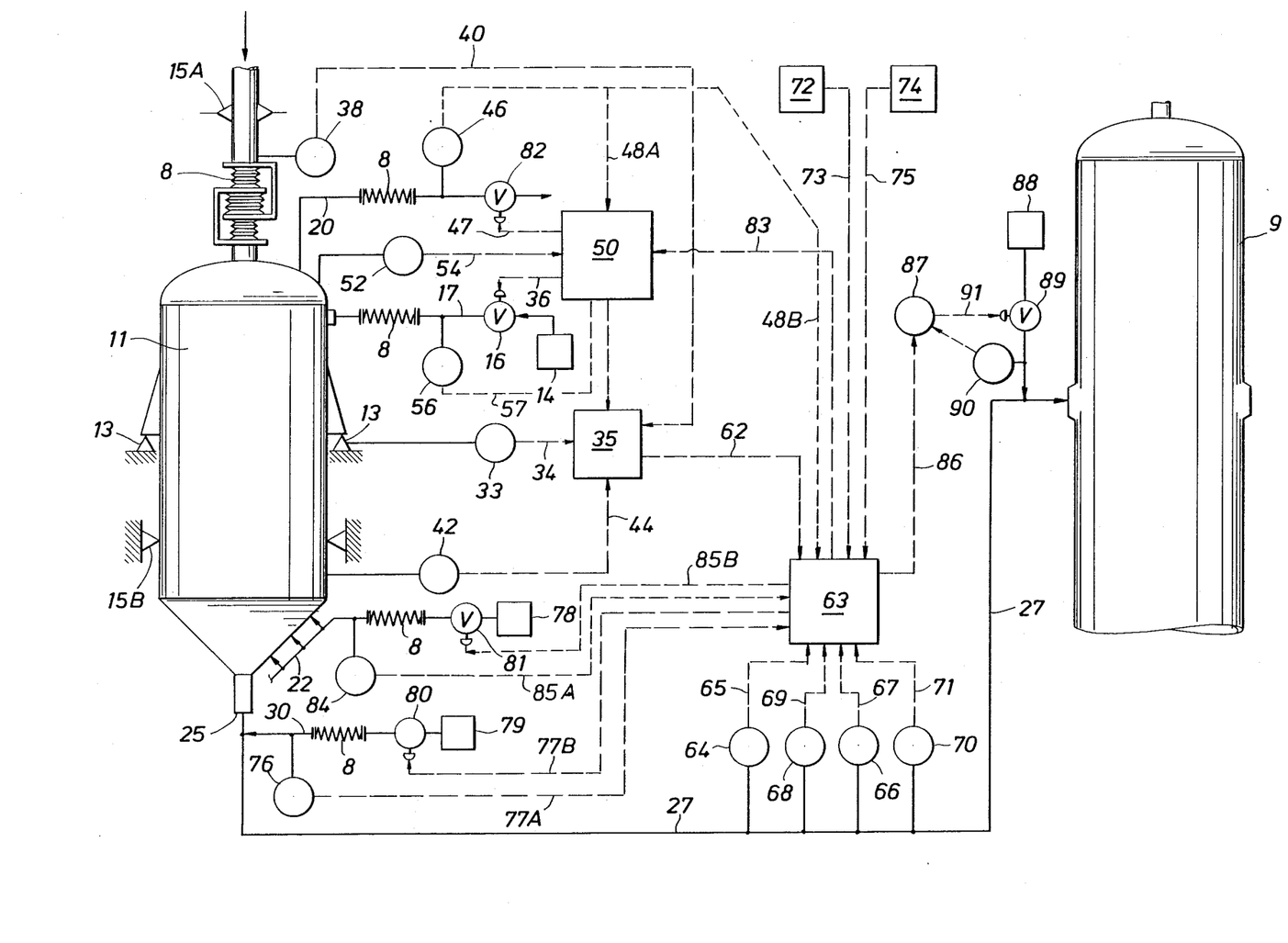
FIG. 1 illustrates a preferred embodiment of the invention.

Referring to the drawing, an apparatus and method for controlling mass flow rate of a solids and gas mixture to a gasifier 9 operated at elevated pressures, say 1–200 bar, generally includes feeding the mixture from a container (not shown), such as a bunker or silo, into a pressurized vessel, shown illustratively as a feed hopper 11, operated typically at pressures of 3–210 bar. A differential pressure of 2–10 bar between the hopper 11 and the gasifier 9 is maintained preferably by injecting gas into an upper portion of the hopper 11 via line 17 from a pressurized gas source 14 to prevent flashback or ingress of synthesis gas into the hopper 11 and thereby maintain coal flow to the burners of the gasifier 9. The rate of injecting gas, determined by indicator 56, is transmitted via signal 57 to the split range pressure controller 50. The rate of venting gas via line 20, determined by transducer 46, is transmitted via line 48A to the split range pressure controller 50 and via line 48B to a second mass flow rate indicating means 63.

A pressure detector, say a transducer 52, transmits a signal 54, to the split range pressure controller 50. Based on the pressure within the hopper 11 the controller 50 transmits a signal via line 47 to operate adjusting valve 82 and via line 36, to operate adjusting valve 16.

The pressure controller 50 regulates the rate of change of pressure in hopper 11 to be preferably 1 bar/min. maximum.

The hopper 11 is preferably designed so that it is isolated in terms of weight from extraneous forces, such as those caused by the elevated pressure of the hopper 11, by a weight isolating device, for example pressure balanced flex joints 8 or bellows and lateral and vertical constraints, tie-bars 15A, 15B for measuring the weight change of the vessel functions properly. Extraneous forces on the hopper 11. which are unrelated to weighing the hopper 11 and are uncharacteristic of loss-in-weight measurement systems operated at pressures lower than 200 bars and temperature changes lower than 80° C., include pressure forces on connections between the weighed hopper 11 and other mechanical components of the system, mechanical forces due to spring constants resulting from flexible connections, and forces on the weighed hopper 11 due to loading and unloading of vessels associated with the hopper 11, forces due to thermal expansion and contraction of the vessel and/or its supports, and seismic forces due to nearby dynamic equipment and vehicles.

A position detector, say a transducer 38, transmits a signal 40 to a first mass flow rate-indicating means, say a preliminary processor 35 such as an analog or digital computing device with the following algorithm: Corrected Weight of Vessel = $K_1$ * Measured Weight of Vessel + $K_2$ * bellow movement + $K_3$ * Vessel Pressure + $K_4$ * Vessel temperature, where $K_1$, $K_2$, $K_3$ and $K_4$ are calibration constants based on a known standard such as a weigh cell at atmospheric conditions. The position indicator 38 responds to the degree of compression in the flex joint 8 so as to allow the present invention to compensate for extraneous forces.

Preferably, the present invention employs both preliminary and primary processors of a system for controlling the mass flow rate of the coal and gas mixture to the gasifier as described hereinafter in further detail.

A means for weighing the mixture contained in the hopper 11, such as one or more load cells 13, shown for illustrative purposes as positioned at approximately the center of gravity of the weigh vessel and its contents when full, but could be placed anywhere on the outer walls of the vessel, although one skilled in the art would recognize that the load cells and other supports could preferably be positioned in a symmetrically-spaced arrangement around the perimeter of the vessel at an elevation above the center of gravity when the vessel is empty or full. A weight detector, say a transducer 33, transmits a signal 34 to the preliminary processor 35 which preferably includes a weight rate indicator controller.

A temperature detector, say a transducer 42, transmits a signal 44 to the preliminary processor 35 to monitor the temperature of the coal and gas mixture within the hopper 11.

A signal 60 relative to the pressure within the hopper 11 is transmitted from the controller 50 to the preliminary processor 35. The processor 35 includes means for combining the signals relative to the weight, deflections, the pressure within the hopper 11, and the temperature to obtain a first signal 62 relative to a mass flow rate of the coal and gas mixture exiting the hopper 11.

To facilitate discharge of the coal from the hopper 11 via opening 25, pressurized gas from a pressurized gas supply source 78 can be supplied at substantially a constant flow rate measured by flow meter 84 into the lower portion of the hopper 11 through line 22. The rate of the gas supplied to the hopper 11 is regulated by adjusting valve 81.

The coal and gas mixture is pneumatically transported via conduit 27 to the gasifier 9, preferably by injecting pressurized gas from a pressurized gas supply source 79 supplied via line 30 and regulated by adjusting valve 80.

Preferably density, pressure, velocity, and temperature detectors, say transducers 64, 68, 66, and 70, respectively, transmit signals 65, 69, 67, and 71, respectively, to a second mass flow rate-indicating means, say a primary processor 63 such as an analog or digital computer programmed such that it is (1) capable of carrying out calculations to derive an instantaneous mass flow rate based on signals 65, 69, 67 and 71 and (2) compensates the errors in this instantaneous mass flow signal by using the corrected mass flow rate calculated by preliminary processor 35, the latter signal having a relatively slow response time but better accuracy than the mass flow signal derived instantaneously.

Additionally, signal 77A from transducer 76 for indicating the rate of transport gas into the conduit 27, and signal 85A from transducer 84 for indicating the rate of aerating gas into the lower portion of the feed vessel 11, are preferably transmitted to the primary processor 63.

Preferably, data concerning the water content and ash content of the coal and gas mixture are provided such that corresponding indicators 72, 74, respectively, transmit signals 73, 75 respectively, to processor 63 to obtain a more accurate corrected mass flow rate of the mixture transported to the gasifier 9. It is recognized by those skilled in the art that data relative to the water content of the mixture can be obtained by A.S.T.M.-D 3173-85 or by using infrared, nuclear magnetic resonance (NMR), microwave attenuation or similar state of the art techniques. Likewise, data relative to the ash content can be obtained by ASTM D 3179-82 or by using nuclear devices such as two-source gamma ray systems, etc.

Signals relative to the corrected mass flow rate or corrected density of the mixture to the gasifier 9 are then transmitted to means for controlling the mass flow rate or density of the mixture to the gasifier 9. For example, signals 77B and 85B are transmitted from controller 63 to valve 80 and 81 to adjust the rate of injecting transport gas and aeration gas repectively. Likewise, signal 83 can be transmitted from controller 63 to pressure controller 50 which in turn transmits either a signal 47 to adjust the rate of venting gas from hopper 11 via valve 82, or a signal 36 to adjust the rate of makeup gas to hopper 11 via valve 16, thereby changing the pressure in the feed vessel and thus changing the mass flow rate to the gasifier.

Furthermore, a signal 86 relative to the corrected mass flow rate of the mixture to the gasifier 9 is preferably transmitted to means for controlling a rate of oxygen supplied by a pressurized source 88, such as a preliminary controller 87. The controller 87 which receives a signal of flow meter 90 transmits a signal 91 to operate adjusting valve 89 so that the required flow rate is reached. Since the atmosphere of the gasifier 9 should be a reducing environment, selectively controlling the weight ratio of oxygen to mixture introduced to the gasifier 9 is desirable. Preferably, the ratio is maintained so that the ratio of oxygen to moisture and ash free coal is in the range of 0.6 to 1.2, more preferably 0.8 to 1.0. Controlling the ratio can be accomplished in various ways including selectively controlling the rate of oxygen-containing gas 88 introduced into the gasifier 9 via valve 89 as described above.

Although the system for controlling the mass flow rate is shown in FIG. 1 in its distributed form as discrete components, it would be readily understood by those skilled in the art that these components could be combined into a single unit or otherwise implemented as may be most convenient for the particular application at hand. Furthermore, although the preferred embodiment has been shown as using an electronic process control system for controlling the mass flow rate of coal transported to the gasifier, it is also understood by those skilled in the art that some components of the present invention could be effected using manual or pneumatic controls.

The foregoing description of the invention is merely intended to be explanatory thereof, and various changes in the details of the described method and apparatus may be made within the scope of the appended claims without departing from the spirit of the invention.

We claim:

1. A method for controlling a mass flow rate of a coal and gas mixture to a gasifier operated at elevated pressures, said method comprising:

feeding said mixture into a vessel operated at elevated pressures;

weighing said mixture in said vessel;

supporting said vessel to minimize lateral and vertical deflections caused by elevated pressures and forces external to the vessel;

injecting a gas into said vessel to maintain a differential pressure between said vessel and said gasifier;

venting gas from the upper portion of said vessel to adjust the pressure between said vessel and said gasifier;

aerating said mixture at a lower portion of said vessel;

discharging said mixture from said vessel into means for transporting said mixture to said gasifier;

injecting a transport gas into said means for transporting said mixture;

transporting said mixture in said means for transporting said mixture to said gasifier;

obtaining a signal relative to the weight of said mixture contained in said vessel;

transmitting said signal relative to the weight of said mixture to a first mass flow rate-indicating means;

obtaining a signal relative to the deflections;

transmitting said signal relative to the deflections to the first mass flow rate-indicating means;

obtaining a signal relative to a temperature within said vessel;

transmitting said signal relative to the temperature to the first mass flow rate-indicating means;

obtaining a signal relative to a rate of venting gas from the upper portion of said vessel;

transmitting the signal relative to the rate of venting gas from the vessel to a pressure-controlling means;

obtaining a signal relative to a pressure within said vessel;

transmitting said signal relative to the pressure to the pressure-controlling means;

obtaining a signal relative to a rate of injecting the gas into the upper portion of said vessel;

transmitting the signal relative to the rate of injecting the gas to the pressure-controlling means;

combining the signals relative to the rates of venting and injecting gas, and the pressure within said vessel to obtain a signal relative to a pressure within said vessel;

transmitting said signal relative to the pressure to the first mass flow rate-indicating means;

combining the signals relative to the weight, deflections, the pressure within said vessel, and the temperature to obtain a first signal relative to a mass flow rate of said mixture exiting said vessel;

obtaining a signal relative to a density of said mixture in said means for transporting said mixture to said gasifier, transmitting the signal relative to the density of said mixture in said means for transporting said mixture to a second mass flow rate-indicating means;

obtaining a signal relative to a velocity of said mixture in said means for transporting said mixture to said gasifier;

transmitting the signal relative to the velocity of said mixture in said means for transporting said mixture to the second mass flow rate-indicating means;

obtaining a signal relative to a pressure of said mixture in said means for transporting said mixture to said gasifier;

transmitting the signal relative to the pressure of said mixture in said means for transporting said mixture to the second mass flow rate-indicating means;

obtaining a signal relative to a temperature of said mixture in said means for transporting said mixture to said gasifier;

transmitting the signal relative to the temperature of said mixture in said means for transporting said mixture to the second mass flow rate-indicating means;

obtaining a signal relative to a water content of said mixture;

transmitting the signal relative to the water content of said mixture to the second mass flow rate-indicating means;

obtaining a signal relative to an ash content of said mixture;

transmitting the signal relative to the ash content of said mixture to the second mass flow rate-indicating means;

obtaining a signal relative to a rate of injecting said transport gas into said means for transporting said mixture to said gasifier;

transmitting the signal relative to the rate of injecting said transport gas into said means for transporting said mixture to the second mass flow rate-indicating means;

obtaining a signal relative to a rate of aerating said lower end of said vessel;

transmitting the signal relative to the rate of aerating said lower end of said vessel to said second mass flow rate-indicating means;

transmitting the signal relative to the rate of venting gas from the vessel to the second mass flow rate-indicating means;

combining the signals relative to the density, velocity, pressure, temperature, water and ash content of said mixture, and the rates of injecting aeration and transport gases, and venting gas from said vessel to obtain a second signal relative to a mass flow rate of said mixture in said means for transporting said mixture to said gasifier;

combining said first and second signals to obtain a corrected mass flow rate of said mixture;

transmitting a signal relative to the corrected mass flow rate of said mixture from the second mass flow rate-indicating means to a means for controlling the mass flow rate of said mixture to said gasifier;

controlling the mass flow rate of said mixture to said gasifier, said step of controlling includes adjusting the rate of injecting transport and aeration gases, and adjusting the rate of venting gas;

transmitting a signal relative to the corrected mass flow rate of said mixture from the second mass flow rate-indicating means to a means for controlling a rate of oxygen introduced into said gasifier; and adjusting the rate of oxygen introduced into said gasifier.

2. A method for controlling a mass flow rate of a coal and gas mixture to a gasifier operated at elevated pressures, said method comprising:

feeding said mixture into a vessel operated at elevated pressures;

weighing said mixture in said vessel;

maintaining a differential pressure between said vessel and said gasifier;

discharging said mixture from said vessel into a means for transporting said mixture to said gasifier;

transporting said mixture in said conduit to said gasifier;

obtaining a signal relative to the weight of said mixture contained in said vessel;

transmitting said signal relative to the weight of said mixture to a first mass flow rate-indicating means;

obtaining a signal relative to a pressure within said vessel;

transmitting said signal relative to the pressure to the first mass flow rate-indicating means;

combining the signals relative to the weight and pressure within said vessel to obtain a first signal relative to a mass flow rate of said mixture exiting said vessel;

obtaining a signal relative to a density of said mixture in said means for transporting said mixture to said gasifier;

transmitting the signal relative to the density of said mixture in said means for transporting said mixture to said gasifier to a second mass flow rate-indicating means;

obtaining a signal relative to a velocity of said mixture in said means for transporting said mixture to said gasifier;

transmitting the signal relative to the velocity of said mixture in said means for transporting said mixture to said gasifier to the second mass flow rate-indicating means;

obtaining a signal relative to a pressure of said mixture in said means for transporting said mixture to said gasifier;

transmitting the signal relative to the pressure of said mixture in said means for transporting said mixture to said gasifier to the second mass flow rate-indicating means;

obtaining a signal relative to a temperature of said mixture in said means for transporting said mixture to said gasifier;

transmitting the signal relative to the temperature of said mixture in said means for transporting said mixture to said gasifier to the second mass flow rate-indicating means;

combining the signals relative to the density and velocity to obtain a second signal relative to a mass flow rate of said mixture in said means for transporting said mixture to said gasifier;

combining said first and second signals to obtain a corrected mass flow rate of said mixture;

transmitting a signal relative to the corrected mass flow rate of said mixture from the second mass flow rate-indicating means to a means for controlling the mass flow rate of said mixture to said gasifier; and controlling the mass flow rate of said mixture to said gasifier.

3. The method of claim 2 including:

supporting said vessel to minimize lateral and vertical deflection caused by elevated pressures and forces external to the vessel;

obtaining a signal relative to the deflections;

transmitting said signal relative to the deflections to the first mass flow rate-indicating means; and combining the signal relative to the deflections with said signals relative to the weight and the pressure within said vessel to obtain a first signal relative to a mass flow rate of said mixture exiting said vessel.

4. The method of claim 2 wherein said maintaining a differential pressure includes:

injecting a gas into an upper portion of said vessel;

venting gas from the upper portion of said vessel;

obtaining a signal relative to a rate of injecting the gas;

transmitting the signal relative to the rate of injecting the gas to the first mass flow rate-indicating means;

obtaining a signal relative to a rate of venting gas;

transmitting the signal relative to the rate of venting gas to the first mass flow rate-indicating means and the second mass flow rate-indicating means;

combining the signal relative to the rate of injecting the gas into the upper portion of said vessel with said signals relative to the weight and the pressure within said vessel to obtain a first signal relative to a mass flow rate of said mixture exiting said vessel;

combining the signal relative to the rate of venting gas from the upper portion of said vessel with said signals relative to the weight and the pressure within said vessel to obtain a first signal relative to a mass flow rate of said mixture exiting said vessel; and combining the signal relative to the rate of venting gas or injecting gas from the upper portion of said vessel with said signals relative to the density, velocity, pressure, and temperature to obtain a second signal relative to a mass flow rate of said mixture in said means for transporting said mixture to said gasifier.

5. The method of claims 2 or 3 or 4 including:

obtaining a signal relative to a temperature within said vessel;

transmitting the signal relative to the temperature to the first mass flow rate-indicating means; and combining the signal relative to the temperature with said signals relative to the weight and the pressure within said vessel to obtain a first signal relative to a mass flow rate of said mixture exiting said vessel.

6. The method of claim 2 including:

obtaining a signal relative to a water content of said mixture;

transmitting the signal relative to the water content of said mixture to the second mass flow rate-indicating means; and combining the signal relative to the water content of said mixture with the signals relative to the density, velocity, pressure and temperature to obtain a second signal relative to the mass flow rate of said mixture in said means for transporting said mixture to said gasifier.

7. The method of claim 2 or 6 including:

obtaining a signal relative to an ash content of said mixture;

transmitting the signal relative to the ash content of said mixture to the second mass flow rate-indicating means; and combining the signal relative to the ash content of said mixture with the signals relative to the density, velocity, pressure and temperature to obtain a second signal relative to the mass flow rate of said mixture in said means for transporting said mixture to said gasifier.

8. The method of claim 2 including:
obtaining a signal relative to a rate of aerating said lower end of said vessel;
transmitting the signal relative to the rate of aerating said lower end of said vessel to said second mass flow rate-indicating means;
obtaining a signal relative to a rate of injecting said transport gas into said means for transporting said mixture to said gasifier;
transmitting the signal relative to the rate of injecting said transport gas into said means for transporting said mixture to said gasifier to the second mass flow rate-indicating means; and
combining the signal relative to the rate of injecting said aeration and transport gases with the signals relative to the density, velocity, pressure and temperature to obtain a second signal relative to the mass flow rate of said mixture in said means for transporting said mixture to said gasifier.

9. The method of claim 2 wherein controlling the mass flow rate of said mixture includes adjusting the mass flow rate of said mixture.

10. The method of claim 9 wherein controlling the mass flow rate of said mixture to said gasifier includes injecting aerating gas into said mixture at a lower portion of said vessel.

11. The method of claim 9 wherein controlling the mass flow rate of said mixture to said gasifier includes injecting a transport gas into the means for transporting said mixture to said gasifier containing said mixture.

12. The method of claim 9 wherein controlling the mass flow rate of said mixture to said gasifier includes adjusting the rate of venting gas from the upper portion of said vessel.

13. The method of claim 9 wherein controlling the mass flow rate of said mixture to said gasifier includes adjusting the rate of oxygen introduced into said gasifier.

14. An apparatus for controlling a mass flow rate of a coal and gas mixture to a gasifier operated at elevated pressures, said apparatus comprising:
means for feeding said mixture into a vessel operated at elevated pressures;
means for weighing said mixture in said vessel;
means for supporting said vessel to minimize lateral and vertical deflections caused by elevated pressures and forces external to the vessel;
means for injecting a gas into an upper portion of said vessel to maintain a differential pressure between said vessel and said gasifier;
means for venting gas from the upper portion of said vessel to adjust the pressure between said vessel and said gasifier;
means for aerating said mixture at a lower portion of said vessel;
means for discharging said mixture from said vessel into means for transporting said mixture to said gasifier;
means for injecting a transport gas into said means for transporting said mixture to said gasifier;
means for obtaining a signal relative to the weight of said mixture contained in said vessel;
means for transmitting said signal relative to the weight of said mixture to a first mass flow rate-indicating means;
means for obtaining a signal relative to the deflections;
means for transmitting said signal relative to the deflections to the first mass flow rate-indicating means;
means for obtaining a signal relative to a temperature within said vessel;
means for transmitting said signal relative to the temperature to the first mass flow rate-indicating means;
means for obtaining a signal relative to a rate of venting gas from the upper portion of said vessel;
means for transmitting the signal relative to the rate of venting gas from the vessel to a pressure-controlling means;
means for obtaining a signal relative to a pressure within said vessel;
means for transmitting said signal relative to the pressure to the pressure-controlling means;
means for obtaining a signal relative to a rate of injecting the gas into the upper portion of said vessel;
means for transmitting the signal relative to the rate of injecting the gas to the pressure-controlling means, said pressure-controlling means includes means for combining the signals relative to the rates of venting and injecting gas, and the pressure within said vessel to obtain a signal relative to a pressure within said vessel;
means for transmitting said signal relative to the pressure to the first mass flow rate-indicating means, said first mass flow rate-indicating means includes means for combining the signals relative to the weight, deflections, the pressure within said vessel, and the temperature to obtain a first signal relative to a mass flow rate of said mixture exiting said vessel;
means for obtaining a signal relative to a density of said mixture in said means for transporting said mixture to said gasifier;
means for transmitting the signal relative to the density of said mixture in said means for transporting said mixture to said gasifier to a second mass flow rate-indicating means;
means for obtaining a signal relative to a velocity of said mixture in said means for transporting said mixture to said gasifier;
means for transmitting the signal relative to the velocity of said mixture in said means for transporting said mixture to said gasifier to the second mass flow rate-indicating means;
means for obtaining a signal relative to a pressure of said mixture in said means for transporting said mixture to said gasifier;
means for transmitting the signal relative to the pressure of said mixture in said means for transporting said mixture to said gasifier to the second mass flow rate-indicating means;
means for obtaining a signal relative to a temperature of said mixture in said means for transporting said mixture to said gasifier;
means for transmitting the signal relative to the temperature of said mixture in said means for transporting said mixture to said gasifier to the second mass flow rate-indicating means;

means for obtaining a signal relative to a water content of said mixture;

means for transmitting the signal relative to the water content of said mixture to the second mass flow rate-indicating means;

means for obtaining a signal relative to an ash content of said mixture;

means for transmitting the signal relative to the ash content of said mixture to the second mass flow rate-indicating means;

means for obtaining a signal relative to a rate of injecting said transport gas into said means for transporting said mixture to said gasifier;

means for transmitting the signal relative to the rate of injecting said transport gas into said means for transporting said mixture to said gasifier to the second mass flow rate-indicating means;

means for obtaining a signal relative to a rate of aerating said lower end of said vessel;

means for transmitting the signal relative to the rate of aerating said lower end of said vessel to said second mass flow rate-indicating means;

means for transmitting the signal relative to the rate of venting gas from the vessel to the second mass flow rate-indicating means, said second mass flow rate-indicating means includes means for combining the signals relative to the density, velocity, pressure, temperature, water and ash content of said mixture, and the rates of injecting aeration and transport gases, and venting gas from said vessel to obtain a second signal relative to a mass flow rate of said mixture in said means for transporting said mixture to said gasifier;

means for combining said first and second signals to obtain a corrected mass flow rate of said mixture;

means for transmitting a signal relative to the corrected mass flow rate of said mixture from the second mass flow rate-indicating means to a means for controlling the mass flow rate of said mixture to said gasifier, said means for controlling includes means for adjusting the rates of injecting transport and aeration gases, and means for adjusting the rate of venting gas;

means for transmitting a signal relative to the corrected mass flow rate of said mixture from the second mass flow rate-indicating means to a means for controlling a rate of oxygen introduced into said gasifier; and means for adjusting the rate of oxygen introduced into said gasifier.

15. An apparatus for controlling a mass flow rate of a coal and gas mixture to a gasifier operated at elevated pressures, said apparatus comprising:

means for feeding said mixture into a vessel operated at elevated pressures;

means for weighing said mixture in said vessel;

means for maintaining a differential pressure between said vessel and said gasifier;

means for discharging said mixture from said vessel into a means for transporting said mixture to said gasifier;

means for transporting said mixture to said gasifier;

means for obtaining a signal relative to the weight of said mixture contained in said vessel;

means for transmitting said signal relative to the weight of said mixture to a first mass flow rate-indicating means;

means for obtaining a signal relative to a pressure within said vessel;

means for transmitting said signal relative to the pressure to the first mass flow rate-indicating means;

means for combining the signals relative to the weight and pressure within said vessel to obtain a first signal relative to a mass flow rate of said mixture exiting said vessel;

means for obtaining a signal relative to a density of said mixture in said means for transporting said mixture to said gasifier;

means for transmitting the signal relative to the density of said mixture in said means for transporting said mixture to said gasifier to a second mass flow rate-indicating means;

means for obtaining a signal relative to a velocity of said mixture in said means for transporting said mixture to said gasifier;

means for transmitting the signal relative to the velocity of said mixture in said means for transporting said mixture to said gasifier to the second mass flow rate-indicating means;

means for obtaining a signal relative to a pressure of said mixture in said means for transporting said mixture to said gasifier;

means for transmitting the signal relative to the pressure of said mixture in said means for transporting said mixture to said gasifier to the second mass flow rate-indicating means;

means for obtaining a signal relative to a temperature of said mixture in said means for transporting said mixture to said gasifier;

means for transmitting the signal relative to the temperature of said mixture in said means for transporting said mixture to said gasifier to the second mass flow rate-indicating means;

means for combining the signals relative to the density, velocity, pressure, and temperature to obtain a second signal relative to a mass flow rate of said mixture in said means for transporting said mixture to said gasifier;

means for combining said first and second signals to obtain a corrected mass flow rate of said mixture;

means for transmitting a signal relative to the corrected mass flow rate of said mixture from the second mass flow rate-indicating means to a means for controlling the mass flow rate of said mixture to said gasifier; and means for controlling the mass flow rate of said mixture to said gasifier.

16. The apparatus of claim 15 including:

means for supporting said vessel to minimize lateral and vertical deflections caused by elevated pressures;

means for obtaining a signal relative to the deflections;

means for transmitting said signal relative to the deflections to the first mass flow rate-indicating means; and means for combining the signal relative to the deflections with said signals relative to the weight and the pressure within said vessel to obtain a first signal relative to a mass flow rate of said mixture exiting said vessel.

17. The apparatus of claim 15 wherein said maintaining a differential pressure includes:

means for injecting a gas into an upper portion of said vessel;

means for venting gas from the upper portion of said vessel;
means for obtaining a signal relative to a rate of injecting the gas;
means for transmitting the signal relative to the rate of injecting the gas to the first mass flow rate-indicating means;
means for obtaining a signal relative to a rate of venting gas;
means for transmitting the signal relative to the rate of venting gas to the first mass flow rate-indicating means and the second mass flow rate-indicating means;
means for combining the signal relative to the rate of injecting the gas into the upper portion of said vessel with said signals relative to the weight and the pressure within said vessel to obtain a first signal relative to a mass flow rate of said mixture exiting said vessel;
means for combining the signal relative to the rate of venting gas from the upper portion of said vessel with said signals relative to the weight and the pressure within said vessel to obtain a first signal relative to a mass flow rate of said mixture exiting said vessel; and
means for combining the signal relative to the rate of venting gas from the upper portion of said vessel with said signals relative to the density, velocity, pressure, and temperature to obtain a second signal relative to a mass flow rate of said mixture in said conduit.

18. The apparatus of claims 15 or 16 or 17 including:
means for obtaining a signal relative to a temperature within said vessel;
means for transmitting the signal relative to the temperature to the first mass flow rate-indicating means; and
means for combining the signal relative to the temperature with said signals relative to the weight and the pressure within said vessel to obtain a first signal relative to a mass flow rate of said mixture exiting said vessel.

19. The apparatus of claim 15 including:
means for obtaining a signal relative to a water content of said mixture;
means for transmitting the signal relative to the water content of said mixture to the second mass flow rate-indicating means; and
means for combining the signal relative to the water content of said mixture with the signals relative to the density, velocity, pressure and temperature to obtain a second signal relative to the mass flow rate of said mixture in said means for transporting said mixture to said gasifier.

20. The apparatus of claim 15 or 19 including:
means for obtaining a signal relative to an ash content of said mixture;
means for transmitting the signal relative to the ash content of said mixture to the second mass flow rate-indicating means; and
means for combining the signal relative to the ash content of said mixture with the signals relative to the density, velocity, pressure and temperature to obtain a second signal relative to the mass flow rate of said mixture in said means for transporting said mixture to said gasifier.

21. The apparatus of claim 15 including:
means for obtaining a signal relative to a rate of aerating said lower end of said vessel;
means for transmitting the signal relative to the rate of aerating said lower end of said vessel to said second mass flow rate-indicating means;
means for obtaining a signal relative to a rate of injecting said transport gas into said means for transporting said mixture to said gasifier;
means for transmitting the signal relative to the rate of injecting said transport gas into said means for transporting said mixture to said gasifier to the second mass flow rate-indicating means; and
means for combining the signal relative to the rate of injecting said aeration and transport gases with the signals relative to the density, velocity pressure and temperature to obtain a second signal relative to the mass flow rate of said mixture in said means for transporting said mixture to said gasifier.

22. The apparatus of claim 15 wherein said means for controlling the mass flow rate of said mixture includes means for adjusting the mass flow rate of said mixture.

23. The apparatus of claim 22 wherein said means for controlling the mass flow rate of said mixture to said gasifier includes means for injecting aerating gas into said mixture at a lower portion of said vessel.

24. The apparatus of claim 22 wherein said means for controlling the mass flow rate of said mixture to said gasifier includes means for injecting a transport gas into the means for transporting said mixture to said gasifier containing said mixture.

25. The apparatus of claim 22 wherein said means for controlling the mass flow rate of said mixture to said gasifier includes means for adjusting the rate of venting gas from the upper portion of said vessel.

26. The apparatus of claim 22 wherein said means for controlling the mass flow rate of said mixture to said gasifier includes means for adjusting the rate of oxygen introduced into said gasifier.

27. A method for controlling a mass flow rate of particulate solids and gas mixture to a reactor, said method comprising:
feeding said mixture into a vessel;
weighing said mixture in said vessel;
supporting said vessel to minimize lateral and vertical deflections caused by elevated pressures and forces external to the vessel;
injecting a gas into an upper portion of said vessel to maintain a differential pressure between said vessel and said reactor;
venting gas from the upper portion of said vessel to adjust the pressure between said vessel and said reactor;
aerating said mixture at a lower portion of said vessel;
discharging said mixture from said vessel into means for transporting said mixture to said reactor;
injecting a transport gas into said means for transporting said mixture;
transporting said mixture in said means for transporting said mixture to said reactor;
obtaining a signal relative to the weight of said mixture contained in said vessel;
transmitting said signal relative to the weight of said mixture to a first mass flow rate-indicating means;
obtaining a signal relative to the deflections;
transmitting said signal relative to the deflections to the mass flow rate-indicating means;
obtaining a signal relative to a temperature within said vessel;

transmitting said signal relative to the temperature to the first mass flow rate-indicating means;
obtaining a signal relative to a rate of venting gas from the upper portion of said vessel;
transmitting the signal relative to the rate of venting gas from the vessel to a pressure-controlling means;
obtaining a signal relative to a pressure within said vessel;
transmitting said signal relative to the pressure to the pressure-controlling means;
obtaining a signal relative to a rate of injecting the gas into the upper portion of said vessel;
transmitting the signal relative to the rate of injecting the gas to the pressure controlling means;
combining the signals relative to the rates of venting and injecting gas, and the pressure within said vessel to obtain a signal relative to a pressure within said vessel;
transmitting said signal relative to the pressure to the first mass flow rate-indicating means;
combining the signals relative to the weight, deflections, the pressure within said vessel, and the temperature to obtain a first signal relative to a mass flow rate of said mixture exiting said vessel;
obtaining a signal relative to a density of said mixture in said means for transporting said mixture to said reactor;
transmitting the signal relative to the density of said mixture in said means for transporting said mixture to a second mass flow rate-indicating means;
obtaining a signal relative to a velocity of said mixture in said means for transporting said mixture to said reactor;
transmitting the signal relative to the velocity of said mixture in said means for transporting said mixture to the second mass flow rate-indicating means;
obtaining a signal relative to a pressure of said mixture in said means for transporting said mixture to said reactor;
transmitting the signal relative to the pressure of said mixture in said means for transporting said mixture to the second mass flow rate-indicating means;
obtaining a signal relative to a temperature of said mixture in said means for transporting said mixture to said reactor;
transmitting the signal relative to the temperature of said mixture in said means for transporting said mixture to the second mass flow rate-indicating means;
obtaining a signal relative to a water content of said mixture;
transmitting the signal relative to the water content of said mixture to the second mass flow rate-indicating means;
obtaining a signal relative to an ash content of said mixture;
transmitting the signal relative to the ash content of said mixture to the second mass flow rate-indicating means;
obtaining a signal relative to a rate of injecting said transport gas into said means for transporting said mixture to said reactor;
transmitting the signal relative to the rate of injecting said transport gas into said means for transporting said mixture to the second mass flow rate-indicating means;
obtaining a signal relative to a rate of aerating said lower end of said vessel;
transmitting the signal relative to the rate of aerating said lower end of said vessel to said second mass flow rate-indicating means;
transmitting the signal relative to the rate of venting gas from the vessel to the second mass flow rate-indicating means;
combining the signals relative to the density, velocity, pressure, temperature, water and ash content of said mixture, and the rates of injecting aeration and transport gases, and venting gas from said vessel to obtain a second signal relative to a mass flow rate of said mixture in said means for transporting said mixture to said reactor;
combining said first and second signals to obtain a corrected mass flow rate of said mixture;
transmitting a signal relative to the corrected mass flow rate of said mixture from the second mass flow rate-indicating means to a means for controlling the mass flow rate of said mixture to said reactor;
controlling the mass flow rate of said mixture to said reactor, said step of controlling includes adjusting the rate of injecting transport and aeration gases, and adjusting the rate of venting gas;
transmitting a signal relative to the corrected mass flow rate of said mixture from the second mass flow rate-indicating means to a means for controlling a rate of oxygen introduced into said reactor; and
adjusting the rate of oxygen introduced into said reactor.

28. A method for controlling a mass flow rate of particulate solids and gas mixture to a reactor operated at elevated pressures, said method comprising:
feeding said mixture into a vessel operated at elevated pressures;
weighing said mixture in said vessel;
maintaining a differential pressure between said vessel and said reactor;
discharging said mixture from said vessel into a means for transporting said mixture to said reactor;
transporting said mixture in said conduit to said reactor;
obtaining a signal relative to the weight of said mixture contained in said vessel;
transmitting said signal relative to the weight of said mixture to a first mass flow rate-indicating means;
obtaining a signal relative to a pressure within said vessel;
transmitting said signal relative to the pressure to the first mass flow rate-indicating means;
combining the signals relative to the weight and pressure within said vessel to obtain a first signal relative to a mass flow rate of said mixture exiting said vessel;
obtaining a signal relative to a density of said mixture in said means for transporting said mixture to said reactor;
transmitting the signal relative to the density of said mixture in said means for transporting said mixture to said reactor to a second mass flow rate-indicating means;
obtaining a signal relative to a velocity of said mixture in said means for transporting said mixture to said reactor;
transmitting the signal relative to the velocity of said mixture in said means for transporting said mixture to said reactor to the second mass flow rate-indicating means;

obtaining a signal relative to a pressure of said mixture in said means for transporting said mixture to said reactor;

transmitting the signal relative to the pressure of said mixture in said means for transporting said mixture to said reactor to the second mass flow rate-indicating means;

obtaining a signal relative to a temperature of said mixture in said means for transporting said mixture to said reactor;

transmitting the signal relative to the temperature of said mixture in said means for transporting said mixture to said reactor to the second mass flow rate-indicating means;

combining the signals relative to the density, velocity, pressure, and temperature to obtain a second signal relative to a mass flow rate of said mixture in said means for transporting said mixture to said reactor;

combining said first and second signals to obtain a corrected mass flow rate of said mixture;

transmitting a signal relative to the corrected mass flow rate of said mixture from the second mass flow rate-indicating means to a means for controlling the mass flow rate of said mixture to said reactor; and controlling the mass flow rate of said mixture to said reactor.

29. The method of claim 28 including:
supporting said vessel to minimize lateral and vertical deflections caused by elevated pressures;
obtaining a signal relative to the deflections;
transmitting said signal relative to the deflections to the first mass flow rate-indicating means; and
combining the signal relative to the deflections with said signals relative to the weight and the pressure within said vessel to obtain a first signal relative to a mass flow rate of said mixture exiting said vessel.

30. The method of claim 28 wherein said maintaining a differential pressure includes:
injecting a gas into an upper portion of said vessel;
venting gas from the upper portion of said vessel;
obtaining a signal relative to a rate of injecting the gas;
transmitting the signal relative to the rate of injecting the gas to the first mass flow rate-indicating means;
obtaining a signal relative to a rate of venting gas;
transmitting the signal relative to the rate of venting gas to the first mass flow rate-indicating means and the second mass flow rate-indicating means;
combining the signal relative to the rate of injecting the gas into the upper portion of said vessel with said signals relative to the weight and the pressure within said vessel to obtain a first signal relative to a mass flow rate of said mixture exiting said vessel;
combining the signal relative to the rate of venting gas from the upper portion of said vessel with said signals relative to the weight and the pressure within said vessel to obtain a first signal relative to a mass flow rate of said mixture exiting said vessel; and
combining the signal relative to the rate of venting gas from the upper portion of said vessel with said signals relative to the density, velocity, pressure, and temperature to obtain a second signal relative to a mass flow rate of said mixture in said means for transporting said mixture to said reactor.

31. The method of claims 28 or 29 or 30 including:
obtaining a signal relative to a temperature within said vessel;
transmitting the signal relative to the temperature to the first mass flow rate-indicating means; and
combining the signal relative to the temperature with said signals relative to the weight and the pressure within said vessel to obtain a first signal relative to a mass flow rate of said mixture exiting said vessel.

32. The method of claim 28 including:
obtaining a signal relative to a water content of said mixture;
transmitting the signal relative to the water content of said mixture to the second mass flow rate-indicating means; and
combining the signal relative to the water content of said mixture with the signals relative to the density, velocity, pressure and temperature to obtain a second signal relative to the mass flow rate of said mixture in said means for transporting said mixture to said reactor.

33. The method of claim 28 or 32 including:
obtaining a signal relative to an ash content of said mixture;
transmitting the signal relative to the ash content of said mixture to the second mass flow rate-indicating means; and
combining the signal relative to the ash content of said mixture with the signals relative to the density, velocity, pressure and temperature to obtain a second signal relative to the mass flow rate of said mixture in said means for transporting said mixture to said reactor.

34. The method of claim 28 including:
obtaining a signal relative to a rate of aerating said lower end of said vessel;
transmitting the signal relative to the rate of aerating said lower end of said vessel to said second mass flow rate-indicating means;
obtaining a signal relative to a rate of injecting said transport gas into said means for transporting said mixture to said reactor;
transmitting the signal relative to the rate of injecting said transport gas into said means for transporting said mixture to said reactor to the second mass flow rate-indicating means; and,
combining the signal relative to the rate of injecting said aeration and transport gases with the signals relative to the density, velocity, pressure and temperature to obtain a second signal relative to the mass flow rate of said mixture in said means for transporting said mixture to said reactor.

35. The method of claim 28 wherein controlling the mass flow rate of said mixture includes adjusting the mass flow rate of said mixture.

36. The method of claim 35 wherein controlling the mass flow rate of said mixture to said reactor includes injecting aerating gas into said mixture at a lower portion of said vessel.

37. The method of claim 35 wherein controlling the mass flow rate of said mixture to said reactor includes injecting a transport gas into the means for transporting said mixture to said reactor containing said mixture.

38. The method of claim 35 wherein controlling the mass flow rate of said mixture to said reactor includes adjusting the rate of venting gas from the upper portion of said vessel.

39. The method of claim 35 wherein controlling the mass flow rate of said mixture to said reactor includes adjusting the rate of oxygen introduced into said reactor.

40. An apparatus for controlling a mass flow rate of a particulate solids and gas mixture to a reactor, said apparatus comprising:
- means for feeding said mixture into a vessel operated at elevated pressures;
- means for weighing said mixture in said vessel;
- means for supporting said vessel to minimize lateral and vertical deflections caused by elevated pressures;
- means for injecting a gas into an upper portion of said vessel to maintain a differential pressure between said vessel and said reactor;
- means for venting gas from the upper portion of said vessel to adjust the pressure between said vessel and said reactor;
- means for aerating said mixture at a lower portion of said vessel;
- means for discharging said mixture from said vessel into means for transporting said mixture to said reactor;
- means for injecting a transport gas into said means for transporting said mixture to said reactor;
- means for obtaining a signal relative to the weight of said mixture contained in said vessel;
- means for transmitting said signal relative to the weight of said mixture to a first mass flow rate-indicating means;
- means for obtaining a signal relative to the deflections;
- means for transmitting said signal relative to the deflections to the first mass flow rate-indicating means;
- means for obtaining a signal relative to a temperature within said vessel;
- means for transmitting said signal relative to the temperature to the first mass flow rate-indicating means;
- means for obtaining a signal relative to a rate of venting gas from the upper portion of said vessel;
- means for transmitting the signal relative to the rate of venting gas from the vessel to a pressure-controlling means;
- means for obtaining a signal relative to a pressure within said vessel;
- means for transmitting said signal relative to the pressure to the pressure-controlling means;
- means for obtaining a signal relative to a rate of injecting the gas into the upper portion of said vessel;
- means for transmitting the signal relative to the rate of injecting the gas to the pressure-controlling means, said pressure-controlling means includes means for combining the signals relative to the rates of venting and injecting gas, and the pressure within said vessel to obtain a signal relative to a corrected pressure within said vessel;
- means for transmitting said signal relative to the corrected pressure to the first mass flow rate-indicating means, said first mass flow rate-indicating means includes means for combining the signals relative to the weight, deflections, the corrected pressure within said vessel, and the temperature to obtain a first signal relative to a mass flow rate of said mixture exiting said vessel;
- means for obtaining a signal relative to a density of said mixture in said means for transporting said mixture to said reactor;
- means for transmitting the signal relative to the density of said mixture in said means for transporting said mixture to said reactor to a second mass flow rate-indicating means;
- means for obtaining a signal relative to a velocity of said mixture in said means for transporting said mixture to said reactor;
- means for transmitting the signal relative to the velocity of said mixture in said means for transporting said mixture to said reactor to the second mass flow rate-indicating means;
- means for obtaining a signal relative to a pressure of said mixture in said means for transporting said mixture to said reactor;
- means for transmitting the signal relative to the pressure of said mixture in said means for transporting said mixture to said reactor to the second mass flow rate-indicating means;
- means for obtaining a signal relative to a temperature of said mixture in said means for transporting said mixture to said reactor;
- means for transmitting the signal relative to the temperature of said mixture in said means for transporting said mixture to said reactor to the second mass flow rate-indicating means;
- means for obtaining a signal relative to a water content of said mixture;
- means for transmitting the signal relative to the water content of said mixture to the second mass flow rate-indicating means;
- means for obtaining a signal relative to an ash content of said mixture;
- means for transmitting the signal relative to the ash content of said mixture to the second mass flow rate-indicating means;
- means for obtaining a signal relative to a rate of injecting said transport gas into said means for transporting said mixture to said reactor;
- means for transmitting the signal relative to the rate of injecting said transport gas into said means for transporting said mixture to said reactor to the second mass flow rate-indicating means;
- means for obtaining a signal relative to a rate of aerating said lower end of said vessel;
- means for transmitting the signal relative to the rate of aerating said lower end of said vessel to said second mass flow rate-indicating means;
- means for transmitting the signal relative to the rate of venting gas from the vessel to the second mass flow rate-indicating means, said second mass flow rate-indicating means includes means for combining the signals relative to the density, velocity. pressure, temperature, water and ash content of said mixture, and the rates of injecting aeration and transport gases, and venting gas from said vessel to obtain a second signal relative to a mass flow rate of said mixture in said means for transporting said mixture to said reactor;
- means for combining said first and second signals to obtain a corrected mass flow rate of said mixture;
- means for transmitting a signal relative to the corrected mass flow rate of said mixture from the second mass flow rate-indicating means to a means for controlling the mass flow rate of said mixture to said reactor, said means for controlling includes means for adjusting the rates of injecting transport and aeration gases, and means for adjusting the rate of venting gas;

means for transmitting a signal relative to the corrected mass flow rate of said mixture from the second mass flow rate-indicating means to a means for controlling a rate of oxygen introduced into said reactor; and means for adjusting the rate of oxygen introduced into said reactor.

41. An apparatus for controlling a mass flow rate of a particulate solids and gas mixture to a reactor, said apparatus comprising:

means for feeding said mixture into a vessel operated at elevated pressures;

means for weighing said mixture in said vessel;

means for maintaining a differential pressure between said vessel and said reactor;

means for discharging said mixture from said vessel into a means or transporting said mixture to said reactor;

means for transporting said mixture in said means for transporting said mixture to said gasifier to said reactor;

means for obtaining a signal relative to the weight of said mixture contained in said vessel;

means for transmitting said signal relative to the weight of said mixture to a first mass flow rate-indicating means;

means for obtaining a signal relative to a pressure within said vessel;

means for transmitting said signal relative to the pressure to the first mass flow rate-indicating means;

means for combining the signals relative to the weight and pressure within said vessel to obtain a first signal relative to a mass flow rate of said mixture exiting said vessel;

means for obtaining a signal relative to a density of said mixture in said means for transporting said mixture to said reactor;

means for transmitting the signal relative to the density of said mixture in said means for transporting said mixture to said reactor to a second mass flow rate-indicating means;

means for obtaining a signal relative to a velocity of said mixture in said means for transporting said mixture to said reactor;

means for transmitting the signal relative to the velocity of said mixture in said means for transporting said mixture to said reactor to the second mass flow rate-indicating means;

means for obtaining a signal relative to a pressure of said mixture in said means for transporting said mixture to said reactor;

means for transmitting the signal relative to the pressure of said mixture in said means for transporting said mixture to said reactor to the second mass flow rate-indicating means;

means for obtaining a signal relative to a temperature of said mixture in said means for transporting said mixture to said reactor;

means for transmitting the signal relative to the temperature of said mixture in said means for transporting said mixture to said reactor to the second mass flow rate-indicating means;

means for combining the signals relative to the density, velocity, pressure, and temperature to obtain a second signal relative to a mass flow rate of said mixture in said means for transporting said mixture to said reactor;

means for combining said first and second signals to obtain a corrected mass flow rate of said mixture;

means for transmitting a signal relative to the corrected mass flow rate of said mixture from the second mass flow rate-indicating means to a means for controlling the mass flow rate of said mixture to said reactor; and means for controlling the mass flow rate of said mixture to said reactor.

42. The apparatus of claim 41 including:

means for supporting said vessel to minimize lateral and vertical deflections caused by elevated pressures;

means for obtaining a signal relative to the deflections;

means for transmitting said signal relative to the deflections to the first mass flow rate-indicating means; and means for combining the signal relative to the deflections with said signals relative to the weight and the pressure within said vessel to obtain a first signal relative to a mass flow rate of said mixture exiting said vessel.

43. The apparatus of claim 41 wherein said maintaining a differential pressure includes:

means for injecting a gas into an upper portion of said vessel;

means for venting gas from the upper portion of said vessel;

means for obtaining a signal relative to a rate of injecting the gas;

means for transmitting the signal relative to the rate of injecting the gas to the first mass flow rate-indicating means;

means for obtaining a signal relative to a rate of venting gas;

means for transmitting the signal relative to the rate of venting gas to the first mass flow rate-indicating means and the second mass flow rate-indicating means;

means for combining the signal relative to the rate of injecting the gas into the upper portion of said vessel with said signals relative to the weight and the pressure within said vessel to obtain a first signal relative to a mass flow rate of said mixture exiting said vessel;

means for combining the signal relative to the rate of venting gas from the upper portion of said vessel with said signals relative to the weight and the pressure within said vessel to obtain a first signal relative to a mass flow rate of said mixture exiting said vessel; and means for combining the signal relative to the rate of venting gas from the upper portion of said vessel with said signals relative to the density, velocity, pressure, and temperature to obtain a second signal relative to a mass flow rate of said mixture in said conduit.

44. The apparatus of claims 41 or 42 or 43 including:

means for obtaining a signal relative to a temperature within said vessel;

means for transmitting the signal relative to the temperature to the first mass flow rate-indicating means; and means for combining the signal relative to the temperature with said signals relative to the weight and the pressure within said vessel to obtain a first signal relative to a mass flow rate of said mixture exiting said vessel.

45. The apparatus of claim 41 including:

means for obtaining a signal relative to a water content of said mixture;

means for transmitting the signal relative to the water content of said mixture to the second mass flow rate-indicating means; and means for combining the signal relative to the water content of said mixture with the signals relative to the density, velocity, pressure and temperature to obtain a second signal relative to the mass flow rate of said mixture in said means for transporting said mixture to said reactor.

46. The apparatus of claim 41 or 45 including:

means for obtaining a signal relative to an ash content of said mixture;

means for transmitting the signal relative to the ash content of said mixture to the second mass flow rate indicating means; and means for combining the signal relative to the ash content of said mixture with the signals relative to the density, velocity, pressure and temperature to obtain a second signal relative to the mass flow rate of said mixture in said means for transporting said mixture to said reactor.

47. The apparatus of claim 41 including:

means for obtaining a signal relative to a rate of aerating said lower end of said vessel;

means for transmitting the signal relative to the rate of aerating said lower end of said vessel to said second mass flow rate-indicating means;

means for obtaining a signal relative to a rate of injecting said transport gas into said means for transporting said mixture to said reactor;

means for transmitting the signal relative to the rate of injecting said transport gas into said means for transporting said mixture to said reactor to the second mass flow rate-indicating means; and means for combining the signal relative to the rate of injecting said aeration and transport gases with the signals relative to the density, velocity, pressure and temperature to obtain a second signal relative to the mass flow rate of said mixture in said means for transporting said mixture to said reactor.

48. The apparatus of claim 41 wherein said means for controlling the mass flow rate of said mixture includes means for adjusting the mass flow rate of said mixture.

49. The apparatus of claim 48 wherein said means for controlling the mass flow rate of said mixture to said reactor includes means for injecting aerating gas into said mixture at a lower portion of said vessel.

50. The apparatus of claim 48 wherein said means for controlling the mass flow rate of said mixture to said reactor includes means for injecting a transport gas into the means for transporting said mixture to said reactor containing said mixture.

51. The apparatus of claim 48 wherein said means for controlling the mass flow rate of said mixture to said reactor includes means for adjusting the rate of venting gas from the upper portion of said vessel.

52. The apparatus of claim 48 wherein said means for controlling the mass flow rate of said mixture to said reactor includes means for adjusting the rate of oxygen introduced into said reactor.

53. A method for controlling the mass flow rate of a coal and gas mixture to a gasifier operated at elevated pressures, said method comprising the steps of:

feeding said mixture into a vessel operated at elevated pressures;

weighing said mixture in said vessel;

maintaining a differential pressure between said vessel and said gasifier;

discharging said mixture from said vessel into a conduit means for transporting said mixture to said gasifier;

transporting said mixture in said conduit to said gasifier;

obtaining a signal relative to the weight of said mixture contained in said vessel;

transmitting said signal relative to the weight of said mixture to a first mass flow rate-indicating means;

obtaining a signal relative to the pressure within said vessel;

transmitting said signal relative to said pressure to said first mass flow rate-indicating means;

combining said signals relative to the weight and pressure within said vessel to obtain a first signal relative to a mass flow rate of said mixture exiting said vessel;

obtaining a signal relative to the density of said mixture in said means for transporting said mixture to said gasifier;

transmitting said signal relative to the density of said mixture in said means for transporting said mixture to said gasifier to a second mass flow rate-indicating means;

obtaining a signal relative to the velocity of said mixture in said means for transporting said mixture to said gasifier;

transmitting said signal relative to the velocity of said mixture in said means for transporting said mixture to said gasifier to the second mass flow rate-indicating means;

combining said signals relative to said density and velocity to obtain a second signal relative to the mass flow rate of said mixture in said means for transporting said mixture to said gasifier;

combining said first and second signals to obtain a corrected mass flow rate of said mixture;

transmitting a signal relative to the corrected mass flow rate of said mixture from said second mass flow rate-indicating means to a means for controlling the mass flow rate of said mixture to said gasifier; and controlling the mass flow rate of said mixture to said gasifier.

54. The method of claim 53 further including the steps of:

obtaining a signal relative to the pressure of said mixture in said means for transporting said gasifier;

transmitting said signal relative to the pressure of said mixture in said means for transporting said mixture to said gasifier to said second mass flow rate-indicating means;

obtaining a signal relative to the temperature of said mixture in said means for transporting said mixture to said gasifier;

transmitting said signal relative to the temperature of said mixture in said means for transporting said mixture to said gasifier to said second mass flow rate-indicating means; and combining said signals relative to density and velocity with said signals relative to pressure and temperature to obtain a second signal relative to the mass flow rate of said mixture in said means for transporting said mixture to said gasifier.

55. An apparatus for controlling the mass flow rate of a coal and gas mixture to a gasifier operated at elevated pressures, said apparatus comprising:

means for feeding said mixture into a vessel operated at elevated pressures;

means for weighing said mixture in said vessel;

means for maintaining a differential pressure between said vessel and said gasifier;

means for discharging said mixture from said vessel into a means for transporting said mixture to said gasifier;

means for transporting said mixture to said gasifier;

means for obtaining a signal relative to the weight of said mixture contained in said vessel;

means for transmitting said signal relative to the weight of said mixture to a first mass flow rate-indicating means;

means for obtaining a signal relative to the pressure within said vessel;

means for transmitting said signal relative to said pressure to said first mass flow rate-indicating means;

means for combining said signals relative to the weight and pressure within said vessel to obtain a first signal relative to the mass flow rate of said mixture exiting said vessel;

means for obtaining a signal relative to the density of said mixture in said means for transporting said mixture to said gasifier;

means for transmitting said signal relative to the density of said mixture in said means for transporting said mixture to said gasifier to a second mass flow rate-indicating means;

means for obtaining a signal relative to the velocity of said mixture in said means for transporting said mixture to said gasifier;

means for transmitting said signal relative to the velocity of said mixture in said means for transporting said mixture to said gasifier to said second mass flow rate-indicating means;

means for combining said signals relative to the density and velocity to obtain a second signal relative to the mass flow rate of said mixture in said means for transporting said mixture to said gasifier;

means for combining said first and second signals to obtain a corrected mass flow rate of said mixture;

means for transmitting said signal relative to the corrected mass flow rate of said mixture from said second mass flow rate-indicating means to a means for controlling the mass flow rate of said mixture to said gasifier; and means for controlling the mass flow rate of said mixture to said gasifier.

56. The apparatus of claim 55 further including:

means for obtaining a signal relative to the pressure of said mixture in said means for transporting said mixture to said gasifier;

means for transmitting said signal relative to the pressure of said mixture in said means for transporting said mixture to said gasifier to said second mass flow rate-indicating means;

means for obtaining a signal relative to the temperature of said mixture in said means for transporting said mixture to said gasifier;

means for transmitting said signal relative to the temperature of said mixture in said means for transporting said mixture to said gasifier to said second mass flow rate-indicating means; and means for combining said signals relative to temperature and pressure with said signals relative to density and velocity to obtain said second signal relative to the mass flow rate of said mixture in said means for transporting said mixture to said gasifier.

57. A method for controlling the mass flow rate of particulate solids and gas mixture to a reactor operated at elevated pressures, said method comprising the steps of:

feeding said mixture into a vessel operated at elevated pressures;

weighing said mixture in said vessel;

maintaining a differential pressure between said vessel and said reactor;

discharging said mixture from said vessel into a conduit means for transporting said mixture to said reactor;

transporting said mixture in said conduit to said reactor;

obtaining a signal relative to the weight of said mixture contained in said vessel;

transmitting said signal relative to the weight of said mixture to a first mass flow rate-indicating means;

obtaining a signal relative to the pressure within said vessel;

transmitting said signal relative to the pressure to said first mass flow rate-indicating means;

combining said signals relative to the weight and pressure within said vessel to obtain a first signal relative to the mass flow rate of said mixture exiting said vessel;

obtaining a signal relative to the density of said mixture in said means for transporting said mixture to said reactor;

transmitting said signals relative to the density of said mixture in said means for transporting said mixture to said reactor to a second mass flow rate-indicating means;

obtaining a signal relative to the velocity of said mixture in said means for transporting said mixture to said reactor;

transmitting said signal relative to the velocity of said mixture in said means for transporting said mixture to said reactor to said second mass flow rate-indicating means;

combining said signals relative to the density and velocity to obtain a second signal relative to the mass flow rate of said mixture in said means for transporting said mixture to said reactor;

combining said first and second signals to obtain a corrected mass flow rate of said mixture;

transmitting the signal relative to the corrected mass flow rate of said mixture from said second mass flow rate-indicating means to a means for controlling the mass flow rate of said mixture to said reactor; and controlling the mass flow rate of said mixture to said reactor.

58. The method of claim 57 further including the steps of:

obtaining a signal relative to the pressure of said mixture in said means for transporting said mixture to said reactor;

transmitting said signal relative to the pressure of said mixture in said means for transporting said mixture to said reactor to said second mass flow rate-indicating means;

obtaining a signal relative to the temperature of said mixture in said means for transporting said mixture to said reactor;

transmitting said signal relative to the temperature of said mixture in said means for transporting said mixture to said reactor to said second mass flow rate-indicating means; and combining said signals relative to temperature and pressure with said signals relative to density and velocity to obtain said second signal relative to the mass flow rate of said mixture in said means for transporting said mixture to said reactor.

59. An apparatus for controlling the mass flow rate of a particulate solids and gas mixture to a reactor, said apparatus comprising:

means for feeding said mixture into a vessel operated at elevated pressures;

means for weighing said mixture in said vessel;

means for maintaining a differential pressure between said vessel and said reactor;

means for discharging said mixture from said vessel into a means for transporting said mixture to said reactor;

means for transporting said mixture in said means for transporting said mixture to said reactor;

means for obtaining a signal relative to the weight of said mixture contained in said vessel;

means for transmitting said signal relative to the weight of said mixture to a first mass flow rate-indicating means;

means for obtaining a signal relative to the pressure within said vessel;

means for transmitting said signal relative to the pressure to said first mass flow rate-indicating means;

means for combining said signals relative to the weight and pressure within said vessel to obtain a first signal relative to the mass flow rate of said mixture exiting said vessel;

means for obtaining a signal relative to the density of said mixture in said means for transporting said mixture to said reactor;

means for transmitting said signal relative to the density of said mixture in said means for transporting said mixture to said reactor to a second mass flow rate-indicating means;

means for obtaining a signal relative to the velocity of said mixture in said means for transporting said mixture to said reactor;

means for transmitting said signal relative to the velocity of said mixture in said means for transporting said mixture to said reactor to said second mass flow rate-indicating means;

means for combining said signals relative to the density and velocity to obtain a second relative to the mass flow rate of said mixture in said means for transporting said mixture to said reactor;

means for combining said first and second signals to obtain a corrected mass flow rate of said mixture;

means for transmitting the signal relative to the corrected mass flow rate of said mixture from the second mass flow rate-indicating means to a means for controlling the mass flow rate of said mixture to said reactor; and means for controlling the mass flow rate of said mixture to said reactor.

60. The apparatus of claim 59 further including:

means for obtaining a signal relative to the pressure of said mixture in said means for transporting said mixture to said reactor;

means for transmitting said signal relative to the pressure of said mixture in said means for transporting said mixture to said reactor to said second mass flow rate indicating means;

means for obtaining a signal relative to the temperature of said mixture in said means for transporting said mixture to said reactor;

means for transmitting said signal relative to the temperature of said mixture in said means for transporting said mixture to said reactor to said second mass flow rate-indicating means; and means for combining said signals relative to pressure and temperature with said signals relative to density and velocity to obtain said second signal relative to the mass flow rate of said mixture in said means for transporting said mixture to said reactor.

* * * * *